United States Patent
Kim et al.

(10) Patent No.: US 9,093,684 B2
(45) Date of Patent: Jul. 28, 2015

(54) CYLINDRICAL SECONDARY BATTERY OF IMPROVED SAFETY

(71) Applicant: LG Chem, Ltd., Seoul (KR)

(72) Inventors: Young Wook Kim, Chungcheongbuk-do (KR); Dong-Myung Kim, Daejeon (KR); Dong Sub Lee, Icheon-si (KR); Dae Sung Kim, Chungcheongbuk-do (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/954,484

(22) Filed: Jul. 30, 2013

(65) Prior Publication Data
US 2013/0316205 A1    Nov. 28, 2013

Related U.S. Application Data

(63) Continuation of application No. PCT/KR2012/001516, filed on Feb. 29, 2012.

(30) Foreign Application Priority Data

Mar. 31, 2011    (KR) .................. 10-2011-0029372

(51) Int. Cl.
*H01M 2/08*    (2006.01)
*H01M 10/02*    (2006.01)
*H01M 2/02*    (2006.01)
*H01M 10/04*    (2006.01)
*C09J 7/02*    (2006.01)
*H01M 10/052*    (2010.01)

(52) U.S. Cl.
CPC ............... *H01M 2/08* (2013.01); *C09J 7/0282* (2013.01); *H01M 2/022* (2013.01); *H01M 10/02* (2013.01); *H01M 10/0431* (2013.01); *C09J 2203/33* (2013.01); *C09J 2401/006* (2013.01); *C09J 2423/00* (2013.01); *C09J 2425/00* (2013.01); *H01M 10/052* (2013.01)

(58) Field of Classification Search
CPC .............. H01M 10/02; H01M 10/052; H01M 10/0587; H01M 10/0431; H01M 2/022; H01M 2/08; C09J 7/0282
See application file for complete search history.

(56) References Cited

U.S. PATENT DOCUMENTS

2003/0235756 A1* 12/2003 McCarley et al. ............. 429/185
2010/0325877 A1* 12/2010 Murata et al. ................ 29/623.1
2011/0008672 A1*  1/2011 Kim .............................. 429/174

FOREIGN PATENT DOCUMENTS

| CN | 1992393 A | 7/2007 |
|----|-----------|--------|
| EP | 2273601 A1 | 10/2001 |
| JP | 6-150971 A | 5/1994 |
| JP | 2001-273933 A | 10/2001 |

(Continued)

OTHER PUBLICATIONS

International search report issued in PCT/KR2012/001516 mailed Sep. 7, 2012.

*Primary Examiner* — Alix Eggerding
(74) *Attorney, Agent, or Firm* — Birch, Stewart, Kolasch & Birch, LLP

(57) ABSTRACT

Disclosed herein is a secondary battery having a jelly roll type electrode assembly ('jelly roll') of a cathode/separator/anode structure mounted in a battery container, wherein a seal tape is attached to an outer side of the jelly roll including a wound end of the jelly roll, and the seal tape reacts with an electrolyte with the result that the seal tape is gelled.

8 Claims, 4 Drawing Sheets

(56) References Cited

FOREIGN PATENT DOCUMENTS

| KR | 10-2007-0047377 A | 5/2007 |
| KR | 10-2009-0088761 A | 8/2009 |
| KR | 10-2010-0109842 A | 10/2010 |
| KR | 10-2011-0004770 A | 1/2011 |

* cited by examiner

CYLINDRICAL SECONDARY BATTERY OF IMPROVED SAFETY

CROSS-REFERENCE TO RELATED APPLICATIONS

This application is a Continuation of PCT International Application No. PCT/KR2012/001516 filed on Feb. 29, 2012, which claims the benefit of Patent Application No. 10-2011-0029372 filed in Republic of Korea on Mar. 31, 2011. The entire contents of all of the above applications are hereby expressly incorporated by reference into the present application.

TECHNICAL FIELD

The present invention relates to a cylindrical secondary battery with improved safety, and, more particularly, to a secondary battery having a jelly roll type electrode assembly ('jelly roll') of a cathode/separator/anode structure mounted in a battery container, wherein a seal tape is attached to an outer side of the jelly roll including a wound end of the jelly roll, and the seal tape reacts with an electrolyte with the result that the seal tape is gelled.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and high discharge voltage, into which much research has been carried out and which is now commercially and widely used.

Depending upon the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet.

Also, the electrode assembly mounted in the battery case is a power generating element, having a cathode/separator/anode stack structure, which can be charged and discharged. The electrode assembly may be classified as a jelly roll type electrode assembly configured to have a structure in which a long sheet type cathode and a long sheet type anode, to which active materials are applied, are wound in a state in which a separator is disposed between the cathode and the anode, a stacked type electrode assembly configured to have a structure in which a plurality of cathodes having a predetermined size and a plurality of anodes having a predetermined size are sequentially stacked in a state in which separators are disposed respectively between the cathodes and the anodes, or a stacked/folded type electrode assembly configured to have a structure in which a predetermined number of cathodes and a predetermined number of anodes are sequentially stacked in a state in which separators are disposed respectively between the cathodes and the anodes to constitute a unit cell, such as a bi-cell or a full cell, and then unit cells are wound using a separation film. The jelly roll type electrode assembly has advantages in that the jelly roll type electrode assembly is easy to manufacture and has high energy density per unit mass.

Generally, a jelly roll type electrode assembly is mounted into a cylindrical metal case to manufacture a cylindrical battery.

When a battery is manufactured using such a jelly roll type electrode assembly (hereinafter, simply referred to as a 'jelly roll'), a cathode/separator/anode stack is wound in a circle, the outermost end of the stack is fixed using a seal tape made of polypropylene (PP) so as to maintain the form of the jelly roll, the stack is mounted in a battery case, i.e. a metal container, an electrolyte is injected into the battery case, and a top cap having an electrode terminal (for example, a cathode terminal) is coupled to an open upper end of the battery case. In this way, a battery is manufactured.

When the secondary battery having the above-described structure comes to the ground or external impact is applied to the secondary battery, however, the jelly roll moves up and down, and therefore, the upper part or the lower part of the jell roll is pressed with the result that the sheets of the jelly roll are deformed, and a short circuit may occur.

Also, the jelly roll is repeatedly expanded and contracted as the secondary battery is repeatedly charged and discharged. At this time, the outer region of the jelly roll is greatly affected by such expansion and contraction. As a result, the electrodes may be broken.

Consequently, the necessity of a technology for fundamentally solving the above-mentioned problem is very high.

DISCLOSURE

Technical Problem

Therefore, the present invention has been made to solve the above problems and other technical problems that have yet to be resolved.

Specifically, it is an object of the present invention to provide a cylindrical secondary battery with improved safety wherein a seal tape reacts with an electrolyte with the result that the seal tape is gelled to increase frictional force with respect to a battery case, thereby preventing movement of a jelly roll.

Technical Solution

In accordance with one aspect of the present invention, the above and other objects can be accomplished by the provision of a secondary battery having a jelly roll type electrode assembly ('jelly roll') of a cathode/separator/anode structure mounted in a battery container, wherein a seal tape is attached to an outer side of the jelly roll including a wound end of the jelly roll, and the seal tape reacts with an electrolyte with the result that the seal tape is gelled.

As previously described, the jelly roll is manufactured to have a structure in which the cathode/separator/anode stack is wound in a circle, the outermost end of the stack is fixed by the seal tape so that the cathode, the separator, and the anode are maintained in a wound state. According to the present invention, the seal tape attached to the outer region of the jelly roll reacts with the electrolyte with the result that the seal tape is gelled. Consequently, it is possible to reduce force applied to the electrodes located at the outer region of the jelly roll due to expansion and contraction during charge and discharge of the battery cell, thereby effectively preventing electrode breakage at the outer region of the jelly roll. Also, frictional force is increased as the result of gelling of the seal tape, thereby restraining upward and downward movement of the jelly roll and thus protecting the battery cell from external impact (dropping and vibration)

The battery container may be, for example, a cylindrical container. A cylindrical secondary battery may be manufactured by winding a cathode sheet and an anode sheet in a state in which a separator is disposed between the cathode sheet and the anode sheet, inserting a jelly roll, to which the seal tape is attached, into a cylindrical container, injecting an electrolyte into the cylindrical container, and sealing the cylindrical container.

According to circumstances, a seal tape may be attached to a jelly roll wound in a circle, the jelly roll may be compressed flat, and the jelly roll may be inserted into a prismatic container to manufacture a prismatic secondary battery.

The seal tape is attached to the outer circumference of the jelly roll so as to cover the outer circumference of the jelly roll including a wound end of the jelly roll. Preferably, the length of the seal tape is set so that the seal tape occupies the minimum space in the battery. If the seal tape is too short, short absorption and frictional force of the gelled seal tape with respect to the inside of the battery container are not great, and therefore, a desired effect may not be expected. On the other hand, if the seal tape is too long, an occupation space of the seal tape in the battery container is excessively increased with the result that the battery may have a capacity smaller than that of another battery having the same battery container standard. Consequently, the seal tape may have a size equivalent to 50 to 90%, preferably 60 to 80%, of the length of the outer circumference of the jelly roll.

In a preferred example, the seal tape may include a tape-shaped film substrate and an adhesive layer applied to a side of the film substrate contacting the jelly roll, and the film substrate may be gelled.

In a concrete example, the film substrate may have a thickness of 20 to 50 µm, and the adhesive layer may have a thickness of 2 to 10 µm. If the thickness of the seal tape is too small, it may be difficult for the battery to exhibit an effect based on gelling of the seal tape. On the other hand, if the thickness of the seal tape is too large, the thickness of the jelly roll is increased in proportion thereto with the result that process efficiency is lowered when the jelly roll is inserted into the battery case. Consequently, the jelly roll may be greatly damaged, or the battery may have a capacity smaller than that of another battery having the same size.

Also, the material for the adhesive layer is not particularly restricted so long as the material for the adhesive layer does not chemically react with the battery. For example, the adhesive layer may be formed of an acryl adhesive or a styrene butadiene rubber (SBR) adhesive.

In the above structure, the physical property of the film substrate may be changed into a form exhibiting adhesiveness when the seal tape is impregnated with the electrolyte. That is, when the seal tape reacts with the electrolyte, the film substrate of the seal tape is mixed with the adhesive layer with the result that the entirety of the seal tape is changed into a gel state exhibiting adhesiveness.

Also, as previously described, movement of the jelly roll in the battery container may be further prevented by adhesiveness of the film substrate according to gelling of the film substrate. A space defined between the jelly roll and the inside of the battery container is filled with the gel exhibiting adhesiveness, thereby preventing free movement of the jelly roll in the battery container. Also, the gel serves as a shock absorbing member against external impact, thereby protecting the jelly roll.

Meanwhile, the material for the seal tape is not particularly restricted so long as the film substrate of the seal tape reacts with the electrolyte with the result that the film substrate is gelled. For example, the seal tape may be formed of cellulose acetate.

Preferably, the battery is a cylindrical lithium secondary battery having high price efficiency and high electrical capacity.

Advantageous Effects

As is apparent from the above description, in the secondary battery according to the present invention, the seal tape is gelled as the result of reaction with the electrolyte, and the space defined between the jelly roll and the inside of the battery container is filled with the gel exhibiting adhesiveness, thereby preventing free movement of the jelly roll in the battery container. Also, the gel serves as a shock absorbing member against external impact, thereby protecting the jelly roll from electrode breakage, dropping and vibration.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
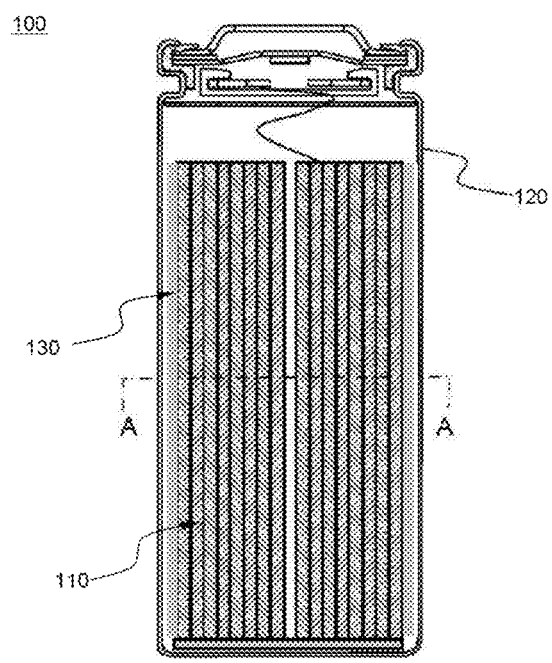
FIG. 1 is a vertical sectional view showing a secondary battery according to an embodiment of the present invention.
Figure 2:
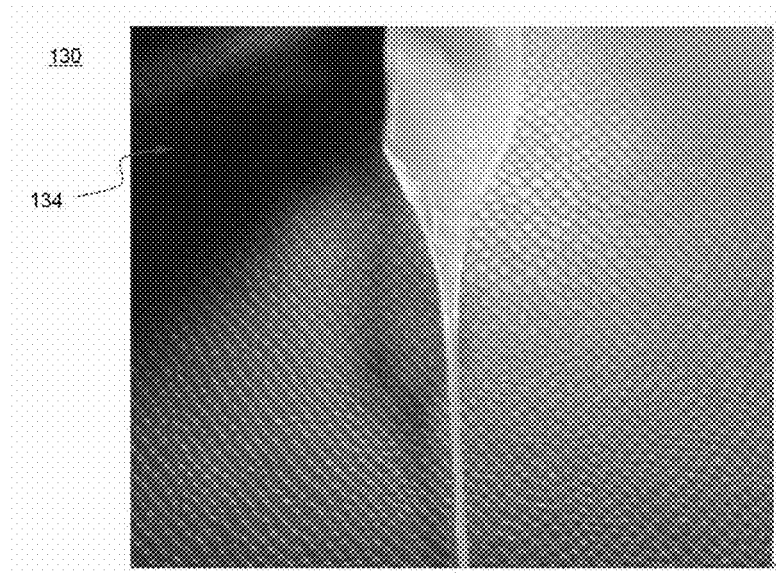
FIG. 2 is a photograph showing gelling of a seal tape.

FIG. 1 is a vertical sectional view typically showing a secondary battery according to an embodiment of the present invention, and FIG. 2 is a photograph showing gelling of a seal tape.

Referring to these drawings, a cylindrical battery 100 is a secondary battery having a jelly roll 110 of a cathode/separator/anode structure mounted in a battery container 120. A seal tape 130 is attached to the outer circumference of the jelly roll 110 so as to cover the outer circumference of the jelly roll 110 in a state in which the seal tape 130 is impregnated with an electrolyte. As shown in FIG. 2, the seal tape 130 reacts with the electrolyte with the result that the seal tape 130 is gelled.

Figure 3:
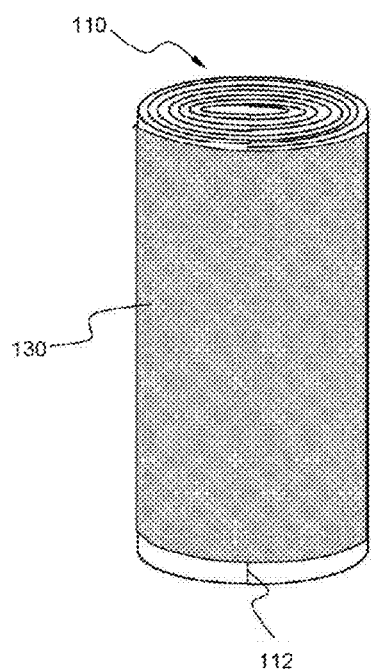
FIG. 3 is a perspective view showing a jelly roll mounted in the cylindrical battery of FIG. 1.
Figure 4:
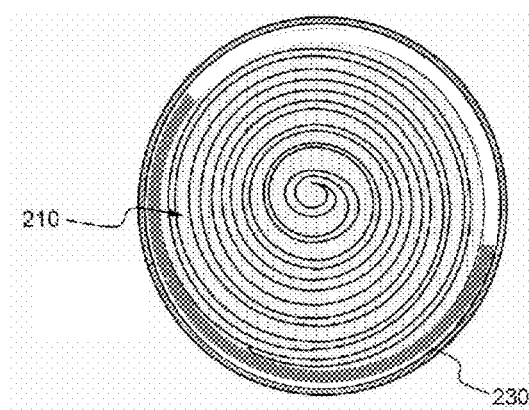
FIG. 4 is a horizontal sectional view taken along line A-A of FIG. 1.
Figure 5:
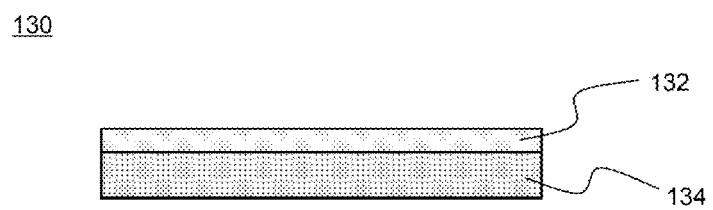
FIG. 5 is a side view of the seal tape shown in FIG. 1.

FIG. 3 is a perspective view typically showing the jelly roll mounted in the cylindrical battery of FIG. 1, FIG. 4 is a horizontal sectional view taken along line A-A of FIG. 1, and FIG. 5 is a side view typically showing the seal tape of FIG. 1.

Referring to these drawings together with FIG. 2, the seal tape 130 is attached to the outer side of the jelly roll 110 including a wound end of the jelly roll 110. The size of the seal tape 130 is equivalent to about 70% of the length of the outer circumference of the jelly roll 110.

The seal tape 130 includes a film substrate 134 having a thickness of 20 µm and an adhesive layer 132, having a thickness of 5 µm, applied to the side of the film substrate 134 contacting the jelly roll 110.

Also, the seal tape 130 is formed of cellulose acetate, and the adhesive layer 132 is formed of an acryl adhesive.

Generally, the film substrate 134 of the seal tape 130 is gelled. Specifically, when the seal tape is impregnated with the electrolyte, the physical property of the film substrate 134 is changed into a form exhibiting adhesiveness. As a result, movement of the jelly roll 110 in the battery container 120 is prevented by adhesiveness of the film substrate 134 according to gelling of the film substrate 134.

Consequently, it is possible for the seal tape 130 to maintain a wound state of the jelly roll 110 and, at the same time, to protect the jelly roll 110 from impact applied to the battery in the lateral direction.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery having a jelly roll type electrode assembly ('jelly roll') of a cathode/separator/anode structure mounted in a battery container, wherein a seal tape is attached to an outer side of the jelly roll comprising a wound end of the jelly roll, and the seal tape reacts with an electrolyte with the result that the seal tape is gelled, wherein the seal tape comprises a tape-shaped film substrate and an adhesive layer applied to a side of the film substrate contacting the jelly roll, and the film substrate is gelled, and wherein, when the seal tape is impregnated with the electrolyte, a physical property of the film substrate is changed into a form exhibiting adhesiveness.

2. The secondary battery according to claim 1, wherein the battery container is a cylindrical container.

3. The secondary battery according to claim 1, wherein the seal tape has a size equivalent to 50 to 90% of a length of an outer circumference of the jelly roll.

4. The secondary battery according to claim 1, wherein the film substrate has a thickness of 10 to 30 μm, and the adhesive layer has a thickness of 2 to 10 μm.

5. The secondary battery according to claim 4, wherein the adhesive layer is formed of an acryl adhesive or a styrene butadiene rubber (SBR) adhesive.

6. The secondary battery according to claim 1, wherein movement of the jelly roll in the battery container is prevented by adhesiveness of the film substrate according to gelling of the film substrate.

7. The secondary battery according to claim 1, wherein the seal tape is formed of cellulose acetate.

8. The secondary battery according to claim 1, wherein the battery is a cylindrical lithium secondary battery.

* * * * *